US012600167B2

(12) United States Patent
Miles et al.

(10) Patent No.: US 12,600,167 B2
(45) Date of Patent: Apr. 14, 2026

(54) SPOKE FOR NON-PNEUMATIC TIRE WITH ADHESION DEFLECTOR AND REINFORCEMENT LAYER

(71) Applicants: COMPAGNIE GENERALE DES ETABLISSEMENTS MICHELIN, Clermont-Ferrand (FR); Kevin C Miles, Greenville, SC (US); Steven M Cron, Greenville, SC (US)

(72) Inventors: Kevin C Miles, Clemson, SC (US); Steven M Cron, Simpsonville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 402 days.

(21) Appl. No.: 18/257,927

(22) PCT Filed: Dec. 22, 2020

(86) PCT No.: PCT/US2020/066546
§ 371 (c)(1),
(2) Date: Jun. 16, 2023

(87) PCT Pub. No.: WO2022/139801
PCT Pub. Date: Jun. 30, 2022

(65) Prior Publication Data
US 2024/0042795 A1 Feb. 8, 2024

(51) Int. Cl.
| | |
|---|---|
| *B60B 9/26* | (2006.01) |
| *B60C 7/14* | (2006.01) |
| *B60C 7/18* | (2006.01) |

(52) U.S. Cl.
CPC ............... *B60B 9/26* (2013.01); *B60C 7/146* (2021.08); *B60C 7/18* (2013.01)

(58) Field of Classification Search
CPC .. B60B 9/26; B60C 7/14; B60C 7/107; B60C 7/146; B60C 7/18; B60C 7/143; B60C 7/22
See application file for complete search history.

(56) References Cited

U.S. PATENT DOCUMENTS

| | | | |
|---|---|---|---|
| 2019/0337329 A1* | 11/2019 | Cron | B60C 7/18 |
| 2020/0039293 A1* | 2/2020 | Cron | B60C 7/18 |

(Continued)

FOREIGN PATENT DOCUMENTS

| | | | | |
|---|---|---|---|---|
| CN | 103129308 A * | 6/2013 | | B60C 7/08 |
| WO | WO-2018067597 A1 * | 4/2018 | | B60C 7/18 |

(Continued)

OTHER PUBLICATIONS

European Patent Office, International Search Report dated Sep. 9, 2021, pp. 1-13 (included), European Patent Office, Rijswijk, The Netherlands.

*Primary Examiner* — Kip T Kotter
(74) *Attorney, Agent, or Firm* — Neal P. Pierotti

(57) ABSTRACT

A spoke (12) for a non-pneumatic tire (10) is provided that has a nose (28) that engages a first panel (16) and a second panel (18). A first foot (20) is carried by the first panel and has a first foot first concave surface (46) and an adhesion deflector (48). A second foot (22) is present and is carried by the second panel. A reinforcement layer (24) engages the first foot first concave surface and the adhesion deflector.

15 Claims, 7 Drawing Sheets

(56)         References Cited

U.S. PATENT DOCUMENTS

2020/0276866 A1 *   9/2020   Wilson ...................... B60C 7/22
2020/0290398 A1 *   9/2020   Wilson ...................... C08L 9/06

FOREIGN PATENT DOCUMENTS

WO        2019132914 A1     7/2019
WO        2020033374 A1     2/2020
WO        2020131405 A1     6/2020

* cited by examiner

SPOKE FOR NON-PNEUMATIC TIRE WITH ADHESION DEFLECTOR AND REINFORCEMENT LAYER

CROSS-REFERENCE TO RELATED APPLICATIONS

The present application is a 35 U.S.C. § 371 application of PCT/US2020/066546 filed on Dec. 22, 2020 and entitled "Spoke for Non-Pneumatic Tire with Adhesion Deflector and Reinforcement Layer" and claims benefit thereto. The entire contents of PCT/US2020/066546 are incorporated by reference herein in their entirety for all purposes.

FIELD OF THE INVENTION

The subject matter of the present invention relates to a spoke for a non-pneumatic tire that features an adhesion deflector and a reinforcement layer to increase the fatigue life of the spoke. More particularly, the present application involves a reinforcement layer located on a foot of the spoke that engages the adhesion deflector, a concave surface, and in some instances a panel of the spoke to increase the strength of the spoke and extend its working life.

BACKGROUND OF THE INVENTION

Non-pneumatic tires can be made of a series of spokes attached to a hub on one end and a shear beam on the other. The tread of the tire is located on the outer surface of the shear band. The plurality of spokes can be V shaped with two legs, two feet, and a nose located generally in the middle. One of the feet is attached to the inner surface of the shear band, and the other is attached to the outer radial surface of the hub. Any number of spokes can be provided around the circumference of the non-pneumatic tire and they will flex as they experience forces generated during rotation and driving. Through the application of force, the spokes may experience cracking which may require replacement or repair of the spoke.

During construction of the foot of the spoke, a tool radius was required at the heel portion of the foot which was at the foot to shear beam junction. This radius provided an opportunity for failure at this location of the spoke. The shape of the heel portion also caused an excessive amount of adhesive to flow along the heel portion of the foot in the radial direction. The excessive adhesive at this location caused a stress concentration that allowed for early failure of the spoke.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

Figure 1:
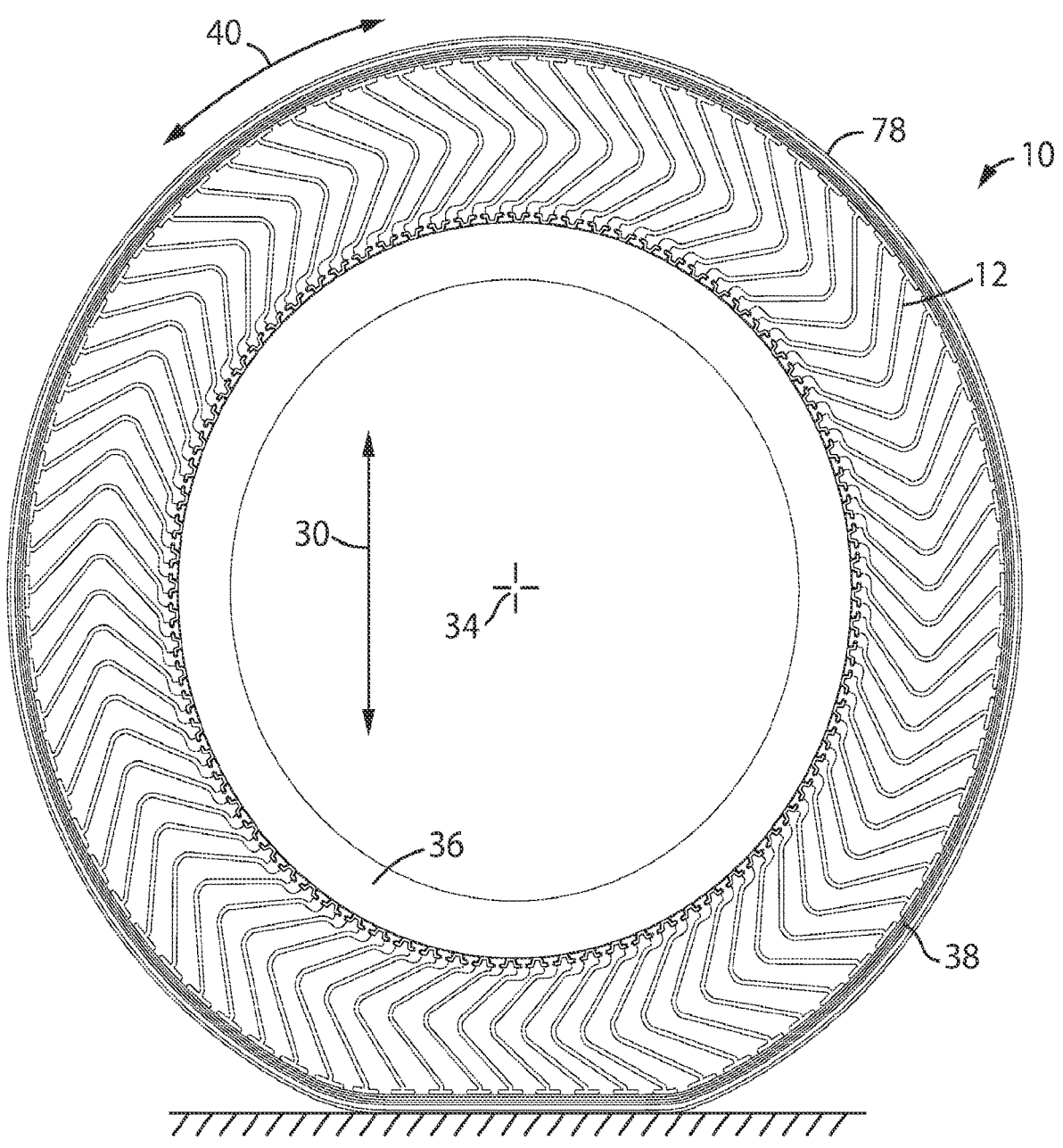
FIG. 1 is a side view of a non-pneumatic tire.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

The present invention provides for a spoke 12 of a non-pneumatic tire 10 that includes a reinforcement layer 24 provided to strengthen an attachment area of the spoke 12 to improve its fatigue life. The reinforcement layer 24 can be located on a concave surface 46 and an adhesion deflector 48 of a foot 20 of the spoke 12. The reinforcement layer 24 may extend along some, but not all, of a leg or panel 16 of the spoke 12. The placement of the reinforcement layer 24 at this location of the spoke 12 reinforces the area of failure that may occur through fatigue of the spoke 12 to extend the life of the spoke 12 in normal operations. The location of the reinforcement layer 24 in the spoke 12 does not significantly impact rolling resistance, and reinforces the heel area of the foot 20 that may be the first portion of the spoke 12 to experience cracking after exceeding the expected life of the spoke 12 during use.

FIG. 1 shows a non-pneumatic tire 10. The non-pneumatic tire 10 has an axis 34 at its center about which it rotates, and a radial direction 30 extends from the axis 34. Tread 78 is located on the outer exterior of a shear band 38 and extends all the way around the non-pneumatic tire 10 in the circumferential direction 40. The shear band 38 is located inward in the radial direction 30 from the tread 78 and likewise extends 360 degrees around the axis 34 in the circumferential direction 40. A series of spokes 12 engage the shear band 38 and extend inward in the radial direction 30 from the shear band 38 to a hub 36 of the non-pneumatic tire 10. The spokes 12 can be adhered to the hub 36 by adhesives, such as glue, in order to attach the spokes 12 to the hub 36. Any number of spokes 12 can be present, and their cross-sectional shape can be different from that shown. In some instances, between 64-80 spokes 12 are present in the non-pneumatic tire 10. In some instances, 32 spokes 12 are present in the non-pneumatic tire 12. The hub 36 is located inward from the spokes 12 in the radial direction 30 and can be mounted onto a wheel of the vehicle. The spokes 12 at the top of the non-pneumatic tire 10 are in tension, and the spokes 12 at the bottom are in compression as the non-pneumatic tire 10 rests on the ground and as the non-pneumatic tire 10 turns in normal operation of the vehicle.

Figure 2:
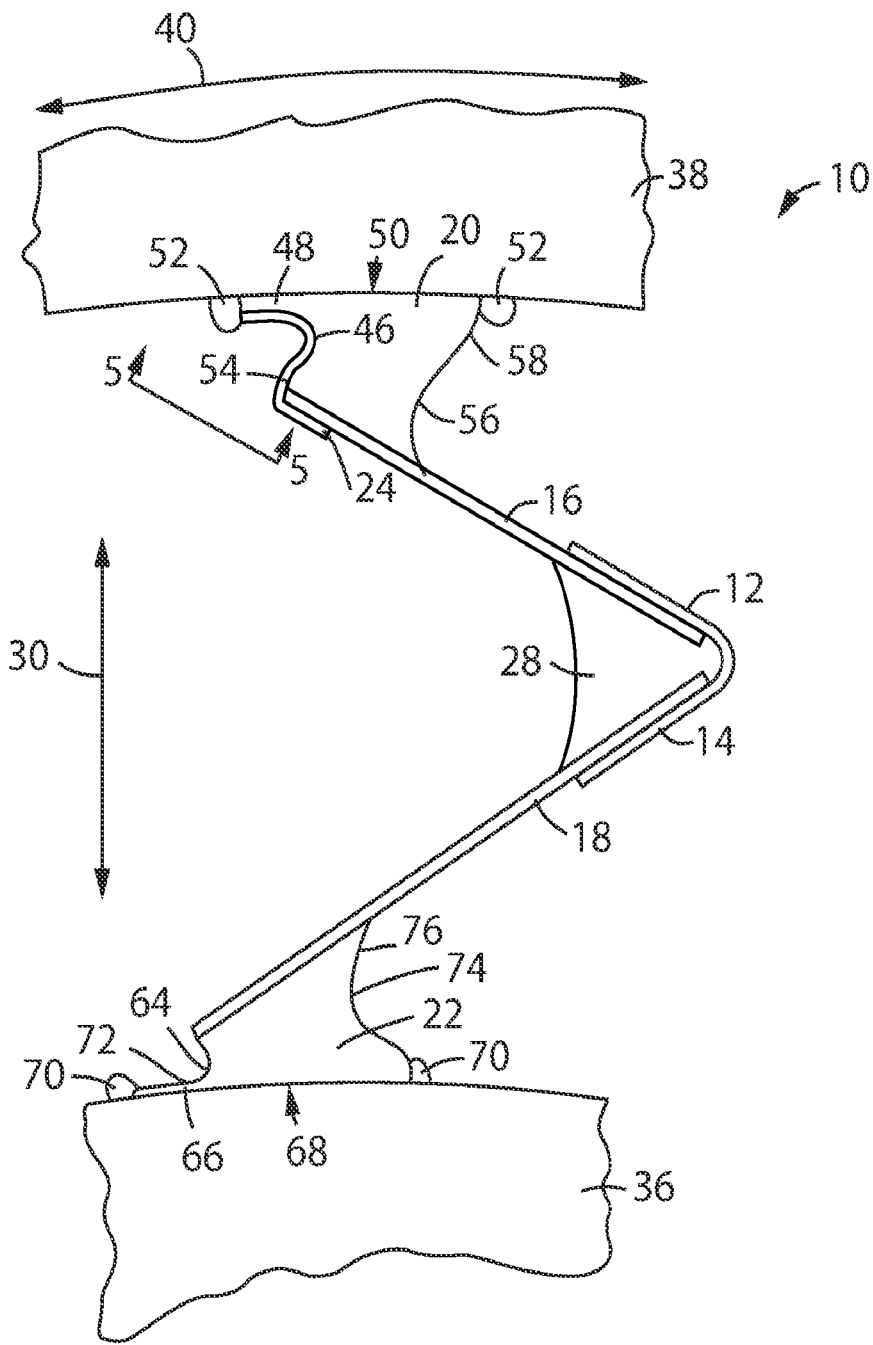
FIG. 2 is a side view of a spoke and portions of a hub and shear band of a non-pneumatic tire.

One embodiment of the spoke 12 is shown in FIG. 2 which is a side view of one of the spokes 12 and portions of the hub 36 and shear band 38. The spoke 12 is made of multiple components attached to one another, and these components can be made of rubber and other materials. The spoke 12 assumes a V-shaped configuration and extends all the way from the hub 36 to the shear band 38 in the radial direction 30. The spoke 12 includes a pair of legs, which are referred to herein as a first panel 16 and a second panel 18. The panels 16 and 18 may engage or not engage one another, and in some embodiments the panels 16 and 18 may be a single continuous piece in which different sections of this continuous piece are designated as a first panel 16 and second panel 18, or can be separate pieces as in FIG. 2. First and second feet 20, 22 are at the ends of the panels 16, 18. A nose 28 is located at the central body of the spoke 12 and has a generally triangular shaped cross-section. The spoke 12 can be assembled by taking uncured, multiple components and assembling them together and then subsequently curing them through heat and pressure so that the components are attached to one another. Each one of these components can include different materials or can have the same materials in different amounts or in the same amount. Rubber, fiberglass, urethane, polyurethane and other materials may be present in the components used to assemble the spoke 12.

The components of the spoke 12 include a first panel 16 and a second panel 18 that make up the legs of the spoke 12. The first panel 16 has the first foot 20 located on one end that engages the first panel 16 and extends farther in the radial direction 30 than the terminal end of the first panel 16. The second panel 18 has a second foot 22 on one end that engages the second panel 18 and extends farther inward in the radial direction 30 than the terminal end of the second panel 18. The nose 28 is present on one side of the spoke 12 in the circumferential direction 40 and engages the first and second panels 16, 18. To reinforce the spoke 12 at its center section, an extended nose reinforcement 14 is provided and engages both the first and second panels 16, 18. The extended nose reinforcement 14 is on opposite sides of the panels 16, 18 in the circumferential direction 40 from the nose 28. The extended nose reinforcement 14 engages the body 28 as well as the panels 16, 18, but in other embodiments the extended nose reinforcement 14 does not engage the body 28. The extended nose reinforcement 14 extends along some of the length of panels 16, 18 but ends short of engaging the feet 20, 22. The extended nose reinforcement 14 need not be present in other embodiments, but if present functions to increase the strength of the spoke 12 near the nose 28. It is to be understood that the shape and size of the spoke 12 can be varied in accordance with different exemplary embodiments, and that a variety of spoke 12 configurations are possible.

The first foot 20 can be variously shaped in accordance with different exemplary embodiments. In the embodiment presented in FIG. 2, the first foot 20 has an adhesive surface 50 that engages the inner radial surface of the shear band 38 and may be attached thereto though the use of adhesive 52. A first foot first concave surface 46 is present on a leading terminal end 54 of the first foot 20. The first foot first concave surface 46 may extend all the way to the first panel 16 or could stop short of the surface of the first foot 20 that engages the first panel 16. The shape of the surface 46 may provide strength and endurance to the foot 20 at this area. The leading terminal end 54 also features an adhesion deflector 48 from which the first foot first concave surface 46 may extend. Alternate embodiments exist in which the adhesion deflector 48 is spaced from the first foot first concave surface 46 such that the first foot first concave surface 46 does not extend from the adhesion deflector 48 but instead other features of the foot 20 are between the first foot first concave surface 46 and the adhesion deflector 48.

The adhesive 52 in addition to being on the adhesive surface 50 also engages the adhesion deflector 48 to cause the adhesion deflector 48 to likewise be attached to the shear band 38. The first foot 20 can be arranged so that the adhesion deflector 48 is integrally formed with the rest of the first foot 20 and is not a separate piece. As such, the adhesive surface 50 and the surface of the adhesive deflector 48 that engages the shear band 38 can form a single uninterrupted surface. The adhesion deflector 48 eliminates the presence of a tool radius that would otherwise be present at the terminal end 54 at this location and relocates the excess adhesive 52 away in the circumferential direction 40 from a high stress zone. During assembly, adhesive 52 that is used to attach the first foot 20 to the shear band 38 can be squeezed out from between these elements to show the two beads illustrated in FIG. 2.

The adhesive deflector 48 extends the surface of the first foot 20 that engages the shear band 38, and the presence of the adhesive deflector 48 eliminates the tool radius that would otherwise be present at the heel area of the foot 20. Elimination of the tool radius eliminates adhesive from being located along the face of the heel and forming a stress concentration that can cause cracking. The extent of the adhesive deflector 48 in the circumferential direction 40 moves the bead of the adhesive 52 beyond the high stress region to prevent cracking as previously discussed.

The first foot 20 has the leading terminal end 54 and an oppositely disposed tailing terminal end 58 in the circumferential direction 40. A first foot second concave surface 56 is located at the tailing terminal end 58 and can extend from the first panel 16 or may be spaced from the first panel 16. The first foot second concave surface 56 can extend to the shear band 38 or may be spaced from the shear band 38 as shown in FIG. 2 in which a convex surface of the tailing terminal end 58 engages the shear band 38. The radius of curvature of the first foot second concave surface 56 can be different than the radius of curvature of the first foot first concave surface 46. The two concave surfaces 46, 56 may extend different lengths in the radial direction 30 such that the first foot first concave surface 46 extends a shorter length in the radial direction 30 than does the first foot second concave surface 56. The adhesive 52 does not contact the first foot second concave surface 56. The first foot 20 engages the first panel 16 along an engagement surface that extends from the leading terminal end 54 to the tailing terminal end 58. Additionally, the adhesive surface 50 and the adhesion deflector 48 extend from the leading terminal end 54 to the tailing terminal end 58.

As previously discussed, the incorporation of the adhesive deflector 48 moves the adhesive 52 away from the high stress zone to prevent cracking. However, upon being moved away the new weak point in the foot 20 is the rubber making up the foot 20, and in particular the rubber at the first foot first concave surface 46. With the presence of the adhesive deflector 48, the first foot 20 will experience cracking first at the first foot first concave surface 46. As such, there should be provided a way to strengthen this area of the first foot 20 to prevent, minimize, or delay this cracking.

In order to strengthen the first foot 20 at the leading terminal end 54, and in particular at the first foot first concave surface 46, a first reinforcement layer 24 is incorporated into the spoke 12. The first reinforcement layer 24 engages the adhesion deflector 48, the first foot first concave surface 46, and the first panel 16. The first reinforcement layer 24 stops short of the nose 28 and is free from engagement with the nose 28, the second panel 18, and the second foot 22. Further, as positioned in the spoke 12, the first reinforcement layer 24 is free from engagement with the adhesive 52 and is also free from engagement with the shear band 38. The first reinforcement layer 24 does not extend to the adhesive surface 50 or to the surface of the adhesive deflector 48 that engages the shear band 38. The first reinforcement layer 24 can engage and cover the majority of the leading terminal end 54 and does not engage or cover any portion of the tailing terminal end 58. The first reinforcement layer 24 strengthens the first foot 20 and reduces cracking at the locations it covers and extends the working life of the spoke 12. In other embodiments, the first reinforcement layer 24 extends around the adhesive deflector 48 tip so that it is located between the adhesive deflector 48 and the shear band 38. In this configuration the first reinforcement layer 24 may engage the adhesive surface 50 and the shear band 38, and the first reinforcement layer 24 can extend along some of the length of the adhesive surface 50 but not along the entire adhesive surface 50.

The second foot 22 can be arranged in the same manner as the first foot 20 or can be arranged in a different shape in other embodiments. In the FIG. 2 embodiment, the second foot 22 is shaped generally in the same manner as the first foot 20. The second foot 22 has an adhesive surface 68 that is concave in shape, as opposed to the convex shaped adhesive surface 50, that engages the convex shaped outer radial end of the hub 36. Adhesive 70 can be used to attach the adhesive surface 68 to the hub 36. A leading terminal end 72 of the second foot 22 faces the same way in the circumferential direction 40 as does the leading terminal end 54. The leading terminal end 72 includes a second foot first concave surface 64 and a second adhesion deflector 66. The second adhesion deflector 66 again functions to space the adhesive 70 from a high stress area of the second foot 22, and the adhesive 70 can secure both the adhesive surface 68 and the bottom of the second adhesion deflector 66 to the hub 36.

The second foot first concave surface 64 can extend from the second adhesion deflector 66 and can terminate at the end of the leading terminal end 72 or may be spaced from the end of the leading terminal end 72. The size, arrangement, and features of the leading terminal end 72 can be the same as those of the leading terminal end 54. The second foot 22 has a tailing terminal end 76 located opposite to the leading terminal end 72 in the circumferential direction 40 and that faces the same way in the circumferential direction 40 as does the tailing terminal end 58. A second foot second concave surface 74 is located at the tailing terminal end 76 and may extend all the way to and engage the second panel 18 or could stop short of and not engage the second panel 18. The radius of curvature of the second foot second concave surface 74 can be different than the radius of curvature of the second foot first concave surface 64. The second foot second concave surface 74 may extend all the way to the hub 36 or may stop short of the hub 36 as shown in FIG. 2. The two concave surfaces 64, 74 may extend different lengths in the radial direction 30 such that the second foot first concave surface 64 extends a shorter length in the radial direction 30 than does the second foot second concave surface 74. There is no reinforcement layer present at the leading terminal end 72 or at the second panel 18. In other embodiments, this situation can be reversed in which there is a reinforcement layer 24 at the second foot 22 at the hub 36, but no reinforcement layer 24 at the first foot 20 that engages the shear band 38.

The spoke 12 will become deformed during normal operation of the tire 10 but can maintain a generally V shape at all points in operation. In this regard, the panels 16, 18 are arranged in a generally V shape with the feet 20, 22 at either ends. In use, the spoke 12 will deform so that the panels 16, 18 move closer to and farther from one another at the tire 10 rotates and the spoke 12 is moved between tension and compression. The adhesives 52, 70 maintain the feet 20, 22 in engagement with the hub 36 and shear band 38. The reinforcement layer 24 strengthens the first foot 20 during the life of the spoke 12 so that cracking at the leading terminal end 54 is reduced or eliminated, or is delayed so that the spoke 12 will be in use for a longer amount of time without experiencing this wear that would otherwise be the case in which the reinforcement layer 24 is absent.

Figure 3:
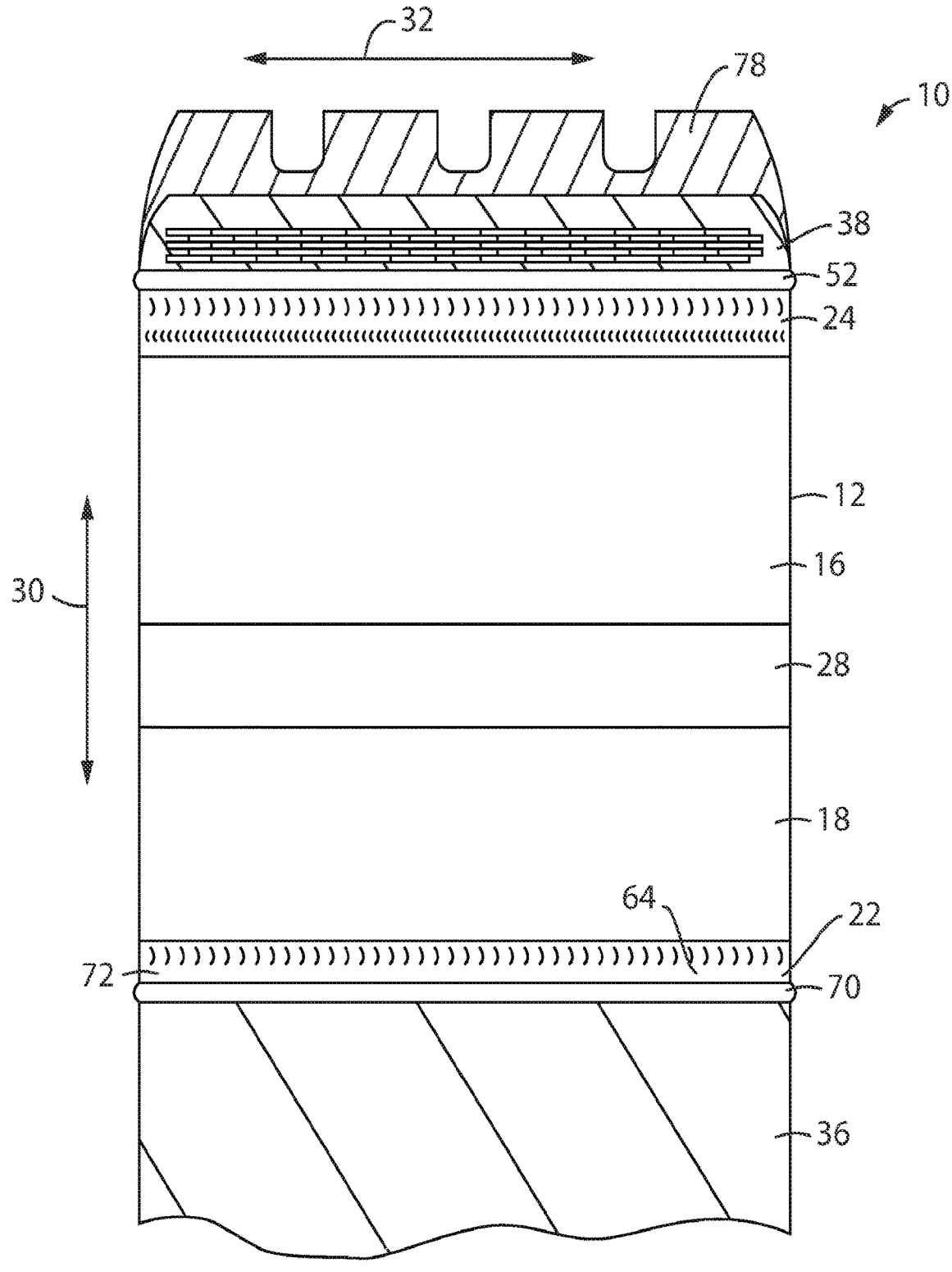
FIG. 3 is a front view of the spoke of FIG. 2 which also shows a cross-sectional view through the tread and shear band, and a portion of the hub.

FIG. 3 is a cross-sectional view taken through the tread 78, shear band 38 and hub 36, and showing the front view of the spoke 12. The tread 78 can be made of various materials and lays on top of the shear band 38 in the radial direction 30. The tread 78 can include any architecture such as grooves, sipes, blocks, or ribs. The shear band 38 has a series of reinforcements that extend the entire length of the shear band 38 in the circumferential direction 40 and may also include other material such as rubber that encases these reinforcements. The hub 36 may be made of metal or other materials. The spoke 12 and all of the variously described features of the spoke 12 can extend in the axial direction 32 the same amount as the extension of the shear band 38, tread 78, and hub 36 in the axial direction 32. When the spoke 12 is attached via the adhesives 52, 70, some of the adhesives 52, 70 can be pushed outboards in the axial direction 32 so that the adhesives 52, 70 are in fact farther outboard in the axial direction 32 than the shear band 38, tread 78 or hub 36. As such, it is to be understood that the reinforcement layer 24 extends the same distance in the axial direction 32 as do the panels 16, 18, the feet 20, 22, the first foot first concave surface 46, the adhesive deflector 48, and the nose 28.

Figure 4:
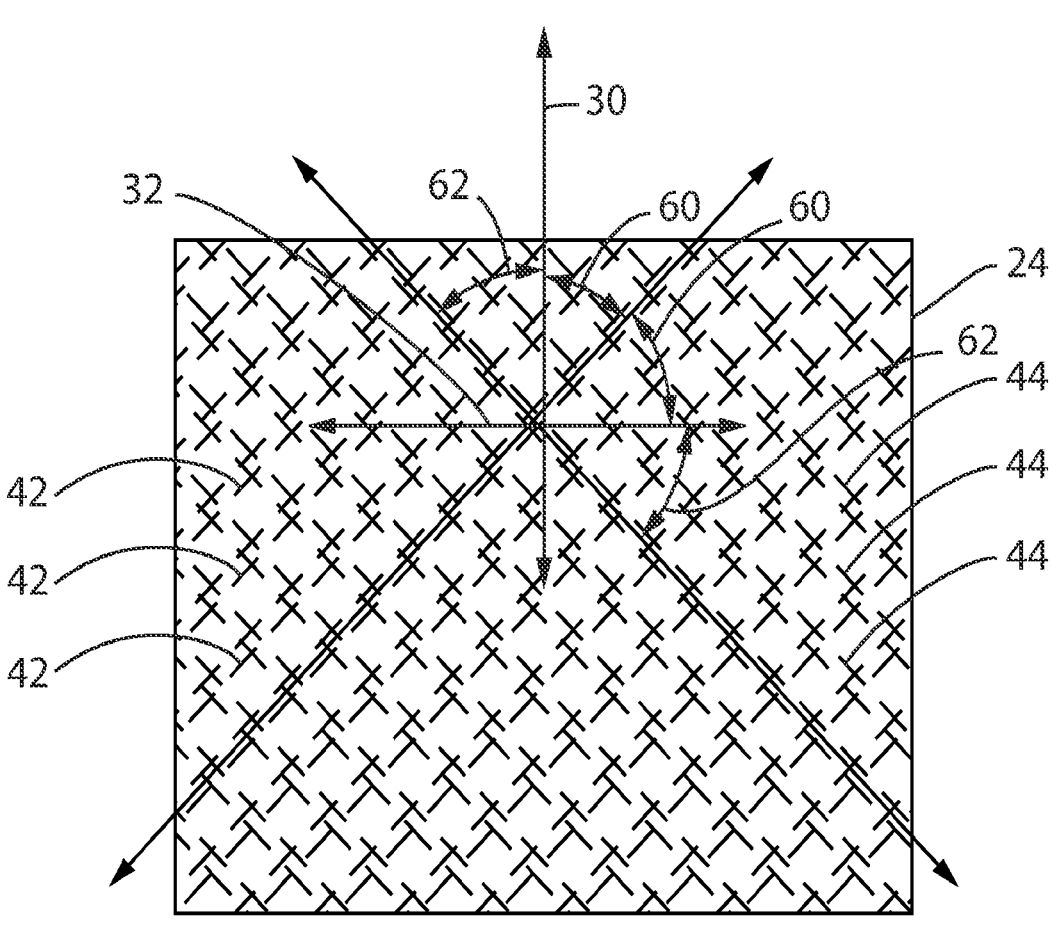
FIG. 4 is a front view of the reinforcement layer showing the cords and their angular arrangement before the reinforcement layer is incorporated into the spoke.

FIG. 4 is a front view of the reinforcement layer 24 before it is incorporated into the spoke 12. The reinforcement layer 24 could be made of one material or different materials in accordance with different embodiments. In the embodiment shown, the reinforcement layer 24 is made of rubber with cords 42, 44 of nylon or polyester embedded within this rubber. The cords 42, 44 may engage one another or can be spaced from one another. The cords 42, 44 may be embedded within rubber of the reinforcement layer 24, so that none of the cords 42, 44 are present on the exterior surface of the rubber making up the reinforcement layer 24. The rubber of the reinforcement layer 24 may make up all of the exterior surfaces of the reinforcement layer 24, and the cords 42, 44 are shown in dashed lines and are not visible from the outside of the reinforcement layer 24. The cords 42, 44 can be made of nylon or polyester such that all of the cords 42, 44 are made of the same material, or so that some of the cords 42, 44 are made of nylon while the remaining cords 44 are made of polyester. For example, all of the cords 42 may be made of nylon, while all of the cords 44 are made of polyester. The cords 42, 44 function to strengthen the reinforcement layer 24 and may be present in any number in other embodiments and may be absent in yet other embodiments of the spoke 12. The reinforcement layer 24 may thus be a textile product in some embodiments.

The cords 42 are distinguished from the cords 44 in that the cords 42 are set at a different angle to cords 44. In this regard, all of the cords 42 are parallel to one another and are spaced from one another and out engagement with one another, and all of the cords 44 are parallel to one another and are spaced from and free from engagement with one another. A radial direction 30 is noted in FIG. 4 and this radial direction 30 would correspond to the radial direction 30 as shown for instance in FIG. 3 such that the top edge of the reinforcement layer 24 in FIG. 4 would be proximate the shear band 38, and the bottom edge of the reinforcement layer 24 in FIG. 4 would be at the first panel 16. The axial direction 32 is a horizontal line in FIG. 4 and corresponds to the axial direction 32 of the tire 10 in that the reinforcement layer 24 would be positioned into the tire 10 so that the axial direction 32 illustrated would overlay the axial direction 32 as in FIG. 3.

As shown in FIG. 4, using the radial direction 30 as a starting point, the first set of cords 42 are oriented at an angle 60 to the radial direction 30 that is positive 45 degrees, which is a clockwise rotation of the cord 42 from the vertical radial direction 30. It is also known in trigonometry to measure an angle from the X axis, and in this regard a second angle 60 is noted in FIG. 4 which is again a positive 45 degrees with the cord 42 rotated counterclockwise from the X axis/axial direction 32. All of the cords 42 can have the same angle 60.

The cord 44 is oriented at an angle 62 to the radial direction 30 which is shown as being rotated from the radial direction 30 in the counterclockwise direction 45 degrees. Since the angle 62 is counterclockwise from the radial direction 30 it is designated as a negative angle so that the angle 62 is negative 45 degrees. Another angle 62 is also shown with respect to the same cord 44, but this additional angle 62 is measured from the horizontal line that is the axial direction 32 and is rotated clockwise from the horizontal line/axial direction 32 and is designated as a negative angle that is a negative 45 degrees. All of the cords 44 can have an angle 62 that is negative 45 degrees.

The resulting structure of cords 42, 44 with their respective angles 60, 62 result in a structure in which the first set of cords 42 and second set of cords 44 are oriented at an angle of 90 degrees to one another. The cords 42, 44 cross over one another and may engage one another at these crossing points, or the cords 42, 44 could be completely out of engagement with one another. When not in engagement, the cords 42 could be at one location in the thickness direction in the reinforcement layer 24, and the cords 44 at a different location in the thickness direction in the reinforcement layer 24. The thickness direction of the reinforcement layer 24 may correspond to the circumferential direction 40 of the tire 10 when the reinforcement layer 24 is placed into the tire 10. As the angle 60 is positive 45 degrees, and the angle 62 is negative 45 degrees the addition of the two angles 60, 62 results in a 90 degree difference between the two. By having cords 42, 44 oriented at an angle relative to one another, the strength of the reinforcement layer 24 is increased, and this increase in strength could be in compression and/or tension. Although shown and described as being oriented at positive and negative 45 degrees, the angles 60, 62 could have different magnitudes in other embodiments. For example, the angles 60, 62 could be 25, 35, 40, 50, 55, 60, from 25-60, from 30-50, from 40-50, or up to 60 degrees in accordance with various embodiments in which one of the angles 60 is positive in direction and the other angle 62 is negative in direction. Also, alternative embodiments exist in which the angles 60 and 62 are zero degrees so that all of the cords 42, 44 are parallel to the radial direction. Although shown as having cords 42, 44 it is to be understood that the reinforcement layer 24 need not have cords 42, 44 in other embodiments.

Figure 5:
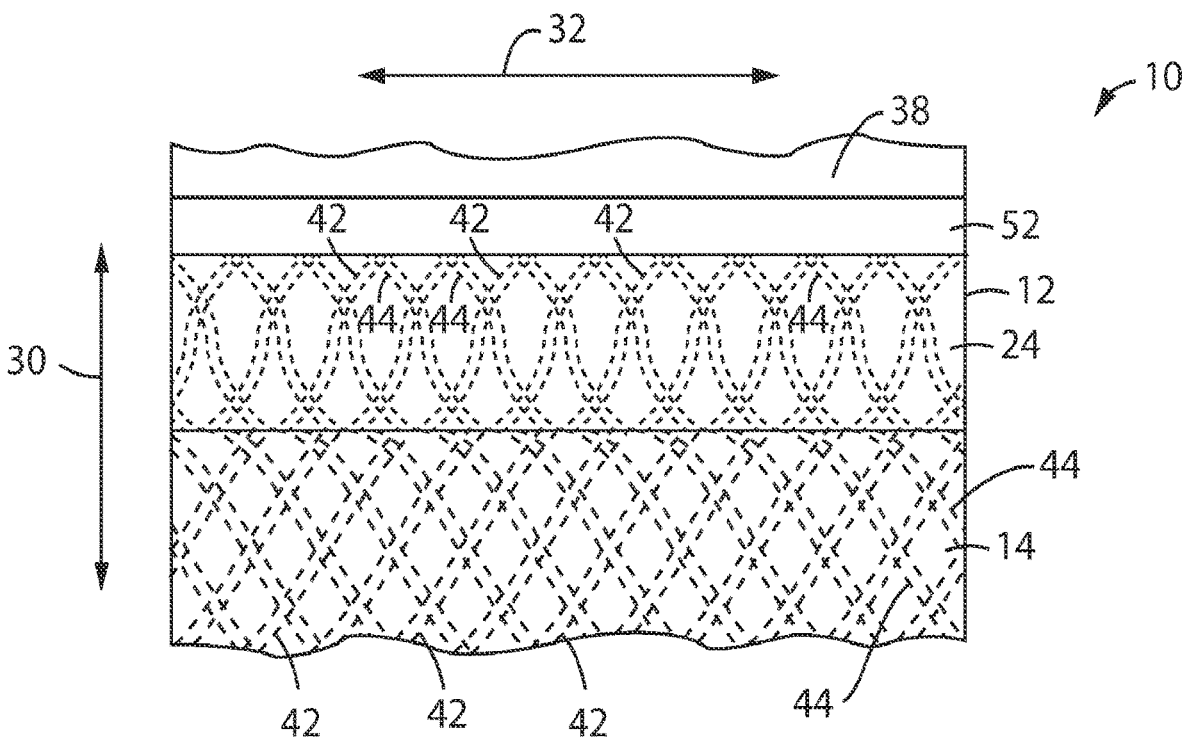
FIG. 5 is a view as designated by line 5-5 in FIG. 2.

FIG. 5 is a view taken along line 5-5 of FIG. 2 which shows the reinforcement layer 24 of FIG. 4 placed into the spoke 12. Due to the curvatures of the first foot first concave surface 46 and the terminal end 54 of the first foot 20, the reinforcement layer 24 will likewise be curved in the circumferential direction 40. Because of this curvature, the angles 60, 62 will not be positive and negative 45 degrees to the radial direction 30 at all locations of the placed reinforcement layer 24. Instead, the angles 60, 62 could have different magnitudes, but the same magnitudes and different directions to one another at the same location in the radial direction 30. This will be true with respect to the reinforcement layer 24 located on the first foot first concave surface 46. The portion of the reinforcement layer 24 located on the first panel 16 will include angles 60, 62 that are +/−45 degrees as shown previously in FIG. 4 in which the cords 42, 44 because the cords 42, 44 are not distorted via circumferential curvature at the first panel 16. As such, the angles 60, 62 can be oriented differently at different locations of the reinforcement layer 24 depending upon the location in the radial direction 30. As used in the claims, when the angles 60, 62 are described as having a particular magnitude or direction, this can be measured with respect to the reinforcement layer 24 as removed from the spoke 12 and placed flat as shown in FIG. 4, or can be measured with respect to the portion of the reinforcement layer 24 that is located on the panel 16. The use of cords 42, 44 that have angles of 60, 62 that are +45 degrees and −45 degrees within the rubber of the reinforced layer 24 enables the foot 20 to endure the compressive strains experienced in this part of the tire 10 while also reinforcing the foot 20 when it is under tension. In this manner, the reinforcement layer 24 prevents, minimizes, or delays cracking of the first foot first concave surface 46 and potentially other portions of the first foot 20.

Figure 6:
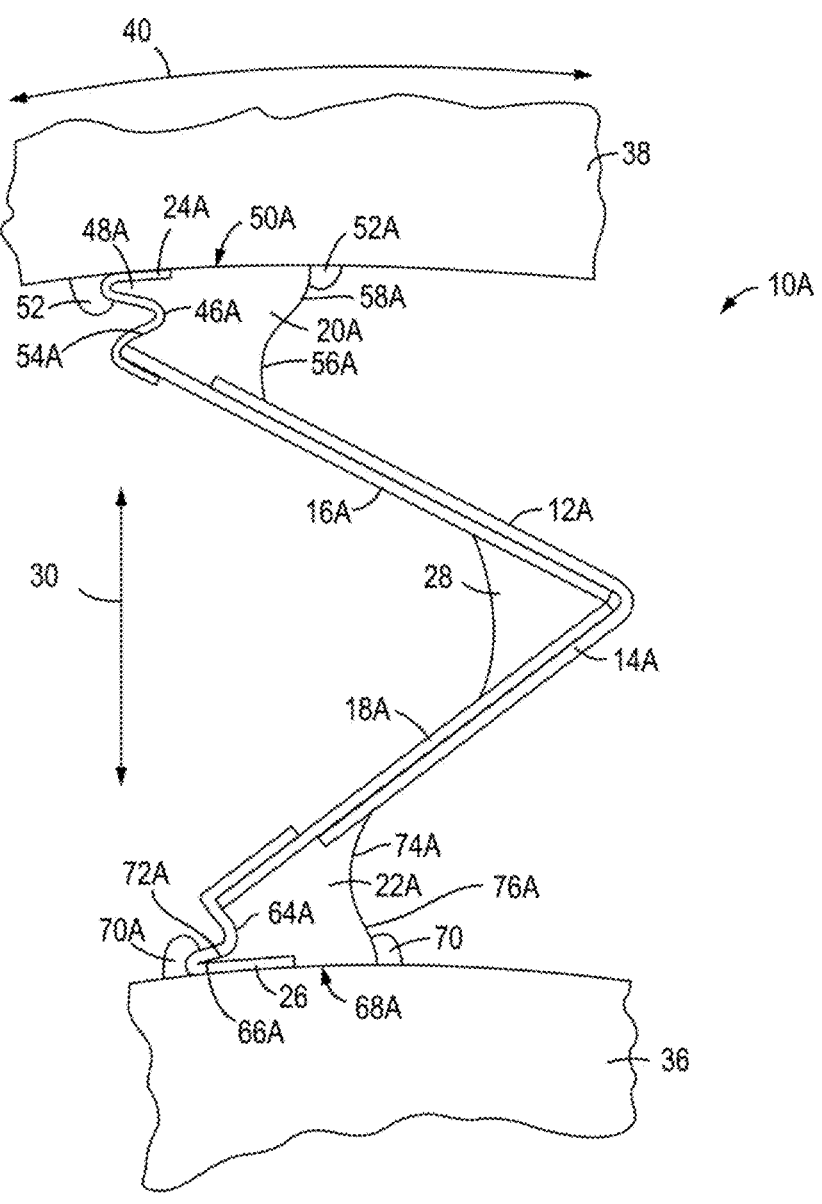
FIG. 6 is a side view of a spoke and portions of a hub and shear band of a non-pneumatic tire in accordance with another embodiment.

FIG. 6 is an alternate embodiment of the spoke 12 similar to that disclosed in FIG. 2. Parts in the FIG. 6 embodiment that are modified from their counterparts in the FIGS. 2-5 embodiment are denoted with an "A" in their reference number. However, the extended nose reinforcement 14 is longer than that in FIG. 2 and extends along the panels 16, 18 all the way to the feet 20, 22 and engages the feet 20, 22. However, the extended nose reinforcement 14 does not extend completely along the entire panels 16, 18 such that the first foot 20 engages both the first panel 16 and the extended nose reinforcement 14, and so that the second foot 22 engages both the second panel 18 and the extended nose reinforcement 14. Placement of the extended nose reinforcement 14 to a position onto the feet 20, 22 moves the ends of the extended nose reinforcement 14 away from a high stress zone near the nose 28 so cracking will be reduced, eliminated, or delayed at the ends of the extended nose reinforcement 14. The first reinforcement layer 24 is configured differently than in the FIG. 2 embodiment. The first reinforcement layer 24 covers and engages the entire first foot first concave surface 46 and the terminal end 54 and also extends to and engages the first panel 16. The first reinforcement layer 24 also engages the adhesive deflector 48 and the adhesive 52. The first reinforcement layer 24 wraps around the terminal end of the adhesive deflector 48 and extends along the adhesive deflector 48 so as to be located between the adhesive deflector 48 and the shear band 38. The first reinforcement layer 24 thus makes up a portion of or otherwise engages the adhesive surface 50. The first reinforcement layer 24 may be arranged with the cords 42, 44 as previously discussed. The spoke 12 also includes a second reinforcement layer 26 at the second foot 22 to strengthen the second foot 22 at this location to prevent, reduce, or delay cracking at this location. The second reinforcement layer 26 engages the adhesive 70, second adhesive deflector 66, and the entire second foot first concave surface 64. The second reinforcement layer 26 wraps around the terminal end of the second adhesive deflector 66 and engages the hub 36 and is located between the hub 36 and the second adhesive deflector 66.

Figure 7:
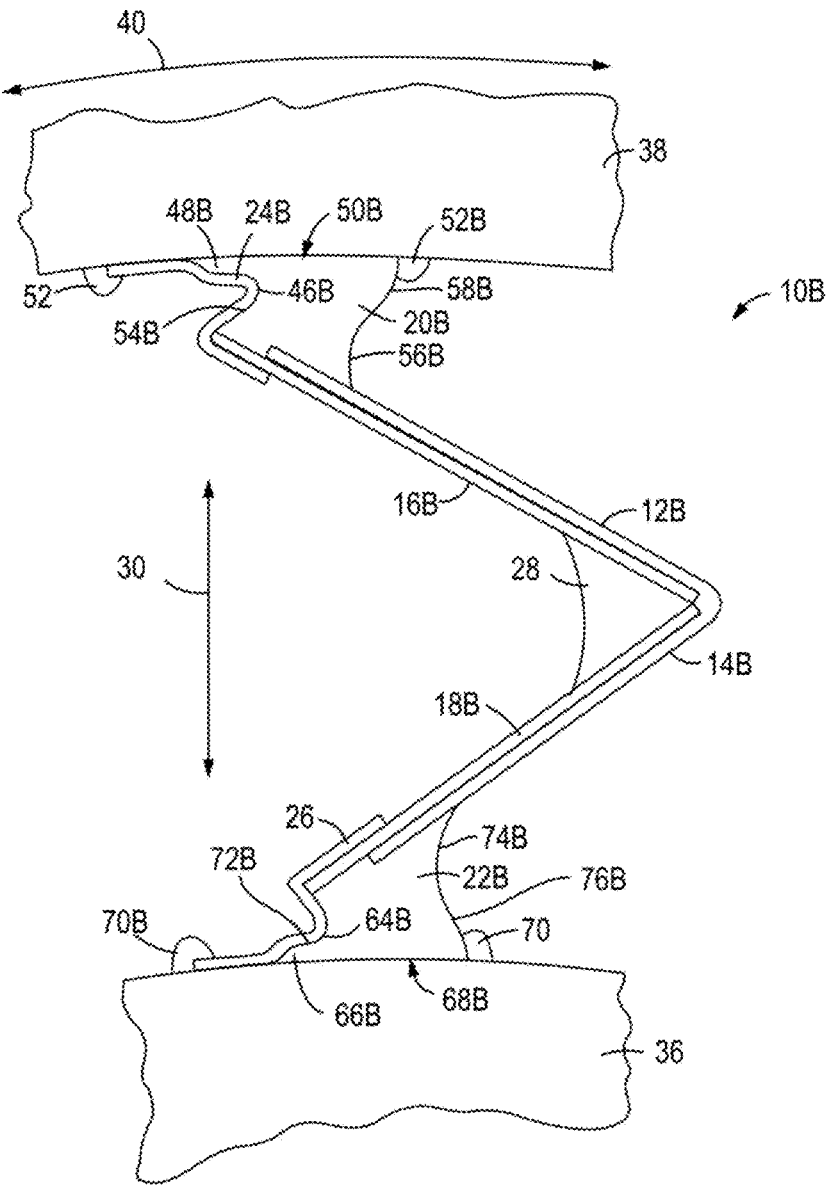
FIG. 7 is a side view of a spoke and portions of a hub and shear band of a non-pneumatic tire in accordance with yet another embodiment.

Parts in the FIG. 7 embodiment that are modified from their counterparts in the FIG. 6 embodiment are denoted with a "B" in their reference number. FIG. 7 shows another embodiment of the tire 10 and spoke 12 in which the extended nose reinforcement 14 is longer than that shown in FIG. 6 so that it extends along the feet 20, 22 to be close to the leading terminal end 54 and the leading terminal end 72 but still stopping short of these leading ends 54, 72 and not coincident with the end of the first and second panels 16, 18. The extended nose reinforcement 14 extends along greater than 50% of the lengths of the feet 20, 22 along their respective first and second panels 16, 18. Extension of the extended nose reinforcement 14 reduces, eliminates or delays cracking at the ends of the nose reinforcements 14 because they are spaced away from high stress areas close to the nose 28. The first reinforcement layer 24 engages the first panel 16, is free from engagement with the extended nose reinforcement 14, engages the entire leading terminal end 54, engages the adhesive 52, and has a length and side that engages the shear band 38. The first reinforcement layer 24 is not located between the adhesive deflector 48 and the shear band 38, and the adhesive deflector 48 is completely covered by the first reinforcement layer 24 so as to be between the first reinforcement layer 24 and the shear band 38. The second reinforcement layer 26 engages the second panel 18, the entire leading terminal end 72, the adhesive 70, and has a length that extends across and engages the hub 36. The second reinforcement layer 26 is free from engagement with the extended nose reinforcement 14. The second reinforcement layer 26 is not located between the second adhesive deflector 66 and the hub 36. The two reinforcement layers 24, 26 can be arranged with the cords 42, 44 as previously discussed and both function to strengthen the feet 20, 22 to prevent, minimize or delay cracking or other failure through use of the spoke 12.

The spoke 12 can be constructed by first forming the various elements that make up the spoke such as the panels 16, 18, feet 20, 22, extended nose reinforcement 14 and reinforcement layers 24, 26. This can be done by forming the elements from rubber with additives if desired as sheets. Nylon or polyester cords can be placed down onto these sheets if desired for the formation of elements such as the panels 16, 18 or reinforcement layers 24, 26 and an additional sheet of rubber can be placed onto these cords to compete the assembly of the element. Extrusion or any other suitable method of formation of the elements are possible. The formed elements 14, 16, 18, 20, 22, 24, and 46 include uncured or green rubber that can has a degree of tackiness that allows them to be stuck to one another in the uncured state. The spoke 12 can thus be assembled with the elements 14, 16, 18, 20, 22, 24 and 26 sticking onto one another in a shape that resembles the final shape of the spoke 12. Next, the uncured partially assembled spoke 12 can be put into a mold in which heat and pressure is applied for a sufficient amount of time to cure the various elements 14, 16, 18, 20, 22, 24 and 26 and form the final shape of the spoke 12 and cause these elements 14, 16, 18, 20, 22, 24 and 26 to be permanently attached to one another. The cured spoke 12 can be attached to the hub 36 and shear band 38 with the adhesives 52, 70 at a point in time after the curing of the spoke 12.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be apparent.

What is claimed is:

1. A spoke for a non-pneumatic tire, comprising:
   a nose;
   a first panel that engages the nose and that extends from the nose;
   a second panel that engages the nose and that extends from the nose;
   a first foot carried by the first panel, wherein the first foot has a first foot first concave surface, wherein the first foot has an adhesion deflector;
   wherein the adhesion deflector and the first foot first concave surface are both located at a leading terminal end of the first foot in a circumferential direction, wherein the first foot has a first foot second concave surface that is located on a tailing terminal end of the first foot in the circumferential direction, wherein the adhesion deflector extends in the circumferential direction such that the adhesion deflector is farther from the first foot second concave surface in the circumferential direction than is the first foot first concave surface to the first foot second concave surface in the circumferential direction, wherein the tailing terminal end of the first foot has a convex surface;
   a second foot carried by the second panel; and
   a reinforcement layer that engages the first foot first concave surface, wherein the reinforcement layer engages the adhesion deflector.

2. The spoke as set forth in claim 1, wherein the reinforcement layer engages the first panel.

3. The spoke as set forth in claim 1, wherein the first foot has an adhesive surface that is configured for engagement with a shear band by adhesive, and wherein the adhesion deflector is configured for engagement with the shear band by the adhesive, and wherein the adhesive surface is longer than the adhesion deflector in the circumferential direction.

4. The spoke as set forth in claim 1, wherein the first foot first concave surface extends from the adhesion deflector.

5. The spoke as set forth in claim 1, wherein the first foot second concave surface is free from engagement with the reinforcement layer.

6. The spoke as set forth in claim 1, wherein the first foot is attached to a shear band by adhesive, and wherein the reinforcement layer is free from engagement with the shear band, and wherein the reinforcement layer is free from engagement with the adhesive that attaches the first foot to the shear band.

7. The spoke as set forth in claim 1, wherein the first foot and the reinforcement layer are not made completely of the same materials.

8. The spoke as set forth in claim 1, wherein the reinforcement layer has a plurality of cords in which some of the cords are oriented at a positive 45 degree angle to a radial direction and in which other ones of the cords are oriented at a negative 45 degree angle to the radial direction.

9. The spoke as set forth in claim 8, wherein the plurality of cords are made of nylon.

10. The spoke as set forth in claim 8, wherein the plurality of cords are made of polyester.

11. The spoke as set forth in claim 1, wherein the reinforcement layer is free from engagement with the nose, the second panel, and the second foot.

12. The spoke as set forth in claim 1, wherein the adhesion deflector is a first adhesion deflector, and wherein the reinforcement layer is a first reinforcement layer;

wherein the second foot has a second foot first concave surface, wherein the second foot has a second adhesion deflector; and further comprising a second reinforcement layer that engages the second foot first concave surface, wherein the second reinforcement layer engages the second adhesion deflector.

13. The spoke as set forth in claim 12, further comprising an extended nose reinforcement that engages the first foot and extends to and engages the second foot, wherein the extended nose reinforcement engages the first panel and the second panel, and wherein the extended nose reinforcement is free from engagement with the first reinforcement layer and the second reinforcement layer.

14. The spoke as set forth in claim 1, further comprising an extended nose reinforcement that engages the first panel and the first foot and extends along the first panel and the first foot but stops short of the reinforcement layer such that the extended nose reinforcement is not in engagement with the reinforcement layer;

wherein the reinforcement layer extends around the adhesion deflector such that the reinforcement layer is between the adhesion deflector and a shear band to which the first foot is attached.

15. The spoke as set forth in claim 1, wherein the reinforcement layer engages a shear band to which the first foot is attached, wherein the reinforcement layer is not located between the shear band and the adhesion deflector.

* * * * *